April 25, 1950     W. F. AMON, JR     2,505,082
LIGHT-POLARIZING SHEET OF MOLECULARLY ORIENTED POLYVINYL
ALCOHOL CONTAINING REACTION PRODUCT OF A
MOLYBDENUM COMPOUND AND A SULFIDE
Filed June 7, 1947
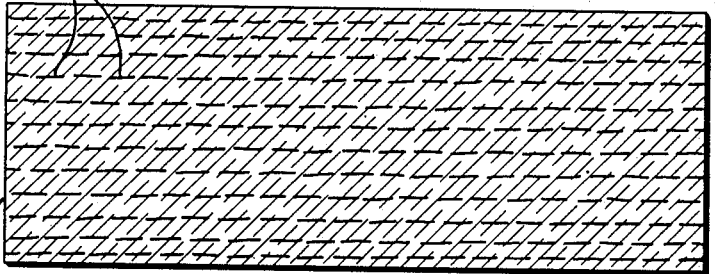
William F. Amon, Jr.
INVENTOR
BY Donald L. Brown
Attorney Patented Apr. 25, 1950

2,505,082

UNITED STATES PATENT OFFICE 2,505,082

LIGHT-POLARIZING SHEET OF MOLECULARLY ORIENTED POLYVINYL ALCOHOL CONTAINING REACTION PRODUCT OF A MOLYBDENUM COMPOUND AND A SULFIDE

William F. Amon, Jr., Boston, Mass., assignor to Polaroid Corporation, Cambridge, Mass., a corporation of Delaware Application June 7, 1947, Serial No. 753,367

2 Claims. (Cl. 88—65)

This invention relates to new and improved light-polarizing material.

This application is a continuation-in-part of my application Serial No. 547,034, filed July 28, 1944, now abandoned.

An object of the invention is to provide economical and stable light-polarizing material in sheet form. Other objects will be apparent to those skilled in the art from the disclosures herein made.

For a fuller understanding of the invention reference should be had to the following description taken in connection with the accompanying drawing, which is a diagrammatic view in section of one embodiment of the invention.

In accordance with one aspect of this invention there is provided a light-polarizing body comprising a sheet of molecularly oriented polyvinyl alcohol in which is incorporated a water-insoluble reaction product of a molybdenum compound and a sulfide formed in situ in said sheet and which is also molecularly oriented. Desirably the polarizing material is the product of the reaction of ammonium molybdate and sodium sulfide separately applied to the sheet in aqueous solution.

The light-polarizing body may be prepared by impregnating a sheet of polyvinyl alcohol successively in either order with an aqueous solution producing molybdenum-containing ions and an aqueous solution producing sulfide ions capable of reacting to form a reaction product in situ. In order to orient the molecules of the polyvinyl alcohol sheet and the reaction product particles with their polarizing axes in substantial parallelism, the sheet may be stretched, preferably under the influence of heat, to approximately six times its original length. As a result of this stretching, the molecules of the polyvinyl alcohol are oriented, and simultaneously orientation of the particles of the reaction product is brought about.

Generally, it will be found desirable to provide the polarizing sheet of the invention with outer protective layers in a manner well known to the art. Thus, the polarizing sheet of this invention may be bonded between a pair of layers of glass or a pair of layers of transparent plastic material by means of adhesive. While suitable adhesives are well known to the art, examples thereof which may be mentioned are plasticized polyvinyl butyral resin, and butyl methacrylate.

Light-polarizing bodies in accordance with this invention are highly uniform in properties. They are substantially free from haze, and therefore exhibit high transparency. Furthermore, they possess the outstanding advantage of ease and simplicity of manufacture. Moreover the reaction product polarizing material of this invention possesses great stability to heat, to ultraviolet radiation and to moisture.

A specific example of a preferred form of this invention and a preferred manner of preparing the same is as follows:

*Example 1*

A sheet of polyvinyl alcohol having a thickness of about 0.005 inch was immersed for about 75 seconds in a 10% aqueous solution of sodium sulfide, after which it was washed with water to remove sodium sulfide solution remaining on the surface of the sheet. The polyvinyl alcohol sheet was then immersed for about 30 seconds in a 10% aqueous solution of ammonium molybdate.

The sheet was then washed briefly with alcohol, and wiped and dried. Following the drying of the polyvinyl alcohol sheet, it was stretched at a temperature of about 130° C. to about six times its original length.

The resulting transparent, oriented light-polarizing sheet was particularly effective as a polarizer in the blue-violet region of the spectrum, and when examined through a neutral analyzer, exhibited a light yellow color when the axis of the sheet was parallel to the analyzer, changing to a strong canary yellow when the axes of the analyzer and sheet were crossed.

The exact nature of the product formed in the polyvinyl alcohol sheet by the reaction in situ between the ammonium molybdate and the sodium sulfide, as described in the above example, is not definitely known, but it may be a form of molybdenum sulfide. But whatever the exact nature of the polarizing material of this invention may be, it is readily and uniformly reproducible, and exhibits uniformly the advantageous characteristics herein described.

It will be understood that various alternatives may be employed in carrying out this invention. Thus, other solutions producing the molybdenum ion and sulfide ion respectively may be employed. Furthermore, hydrogen sulfide may be employed in any suitable manner. The concentration of the reacting solutions is not critical. Moreover, the polyvinyl alcohol sheet may be treated with these solutions in any desired sequence.

If desired, the polyvinyl alcohol sheet initially may be cast from a water solution containing a molybdenum salt in relatively low concentration. In this manner one of the steps involving the treatment of polyvinyl alcohol sheet with solution may be omitted.

The temperature at which the polyvinyl alcohol sheet is stretched is not critical although such temperature should not be higher than that at which the polyvinyl alcohol tends to flow. Thus temperatures of from about 120° C. to about 170° C. have been found suitable.

Generally speaking, for the purposes of the invention the polyvinyl alcohol sheet may be stretched so as to extend the sheet approximately two and one-half to eight times its original length. Ordinarily the greater the stretch of the polyvinyl alcohol sheet, the more efficient will be the resulting light-polarizing body.

If desired the polyvinyl alcohol sheet may be stretched before it has been treated with the molybdenum and sulfide solutions. However, where this procedure is followed, it is generally necessary to dry and restretch the polyvinyl alcohol sheet following the steps of treating the sheet with the salt solutions. This is because the polyvinyl alcohol sheet tends to shrink as a result of the solution-treating steps.

It will be noted that the product of this invention is simple and economical to manufacture. Furthermore, the polarizing particles of reaction product as formed in accordance with this invention are of optimum size and character in that they produce minimum haze, and consequently maximum transparency in the polarizing sheet.

Since certain changes may be made in the above product without departing from the scope of the invention herein involved, it is intended that all matter contained in the above description shall be interpreted as illustrative and not in a limiting sense.

What is claimed is:

1. A substantially haze-free light-polarizing sheet comprising molecularly oriented polyvinyl alcohol having incorporated therein the transparent, highly dichroic, heat-stable, molecularly oriented, water-insoluble product comprising polyvinyl alcohol, sulfide ions and molybdenum ions, which is the chemical reaction product of the imbibition into the polyvinyl alcohol sheet of a relatively low concentration of a water-soluble molybdenum compound and substantially the same concentration of a water-soluble sulfide, the dichroism of said sheet deriving essentially from said molecularly oriented reaction product.

2. A substantially haze-free light-polarizing sheet comprising molecularly oriented polyvinyl alcohol having incorporated therein the transparent, highly dichroic, heat-stable, molecularly oriented, water-insoluble product comprising polyvinyl alcohol, sulfide ions and molybdenum ions, which is the chemical reaction product of the imbibition into the polyvinyl alcohol sheet of substantially the same relatively low concentrations of ammonium molybdate and alkaline sodium sulfide, the dichroism of said sheet deriving essentially from said molecularly oriented reaction product.

WILLIAM F. AMON, Jr.

REFERENCES CITED

The following references are of record in the file of this patent:

UNITED STATES PATENTS

| Number | Name | Date |
| --- | --- | --- |
| 1,629,161 | Hermann et al. | May 17, 1927 |
| 2,215,196 | Schlack | Sept. 17, 1940 |
| 2,237,567 | Land | Apr. 8, 1941 |

OTHER REFERENCES

Thorpe, Dictionary of Applied Chemistry, 4th edition, vol. 8, page 223.